UNITED STATES PATENT OFFICE.

JOHN J. FITZGERALD, OF CHICAGO, ILLINOIS, ASSIGNOR OF FIFTY-FIVE ONE-HUNDREDTHS TO EUGENE M. KEELEY, TWENTY-FIVE ONE-HUNDREDTHS TO JOHN M. WEIR, AND TWENTY ONE-HUNDREDTHS TO ROBERT T. WEIR.

PROCESS OF PROTECTIVELY PRESERVING FOOD PRODUCTS.

1,048,675.  Specification of Letters Patent.  Patented Dec. 31, 1912.

No Drawing.  Application filed April 22, 1909.  Serial No. 491,628.

*To all whom it may concern:*

Be it known that I, JOHN J. FITZGERALD, a citizen of the United States, residing in Chicago, in the county of Cook and State of Illinois, have invented a new and useful Improvement in Processes of Protectively Preserving Food Products, of which the following is a specification.

My invention has for its object a process for protectively wrapping perishable food-products in such manner that they will be preserved from decay or molding or fermentation or other form of organic decomposition and from the ravages of insects or insect larvæ, without introducing preservatives into the body of the food-products to be wrapped.

The protective preservative wrapping involved in my process is set forth in my co-pending application, Serial No. 491,618, filed Apr. 22, 1909.

Many food-products, such for instance, as prepared or smoked meats, and other prepared foods, are prepared, ready for wrapping, in such manner that at the time they are wrapped they are entirely safe from subsequent decomposition or molding or the ravages of insect larvæ if it is possible to prevent the subsequent development of mold or decomposition through or just under the wrapping and to prevent the attack of insects or deposit of insect-eggs through the wrapping or envelop of the wrapped product. To treat the body of the food-product with preservatives, antiseptic or insecticidal, may impair the food qualities or wholesomeness of the product or even make it seriously injurious to health.

The process of my present invention consists in:—first, impregnating the wrapping-material with an antiseptic solution preventive of the development of mold-spores or of any germs of decay or decomposition, and also with an insectifuge or active principle that is repellent to insects, and then closely or hermetically wrapping or enveloping the prepared food-product with such impregnated wrapping-material. For the antiseptic solution I may use, preferably, such an antiseptic as a boron compound, preferably a solution of borax; and for the insectifuge I may use such an active principle as the essence, essential oil, extract, or other active principle of a spice or condiment that is repellent or repulsive to insects, and preferably I use an emulsion of the oleoresin of such spice, a preferred oleoresin being that of capsicum. The borax solution used may be a saturated aqueous one, but it is applied in such limited quantity that the proportion of borax deposited in the wrapping-material is only a small percentage, preferably about two and one-half percentum, of the weight of the wrapping-material impregnated, so that no objectionable excess of the crystalline boron compound is deposited in said wrapping-material; and the preparation of the oleoresin of capsicum used is applied in such proportion that the oleoresin deposited is, preferably, about one two-thousandth part, or five hundredths of one percentum, of the weight of the wrapping-material impregnated. The mixture of the oleoresin with the aqueous solution of the boron compound, for application to the wrapping material, is effected by first making a perfect emulsion of oleoresin with the aid of an emulsifying agent, such as gum-arabic, and then mixing such emulsion thoroughly with the aqueous solution, effecting a perfect diffusion of the emulsion through the solution, so that when the wrapping-material is impregnated with the mixture, the boron compound and the oleoresin of capsicum will both be evenly distributed throughout the entire substance of said wrapping-material. The wrapping-material used may be wrapping-paper or other fibrous wrapping-material or wrapping-fabric or cardboard or scale-board or other wrapping-material used for packing or enveloping meats or other food-products. When the food-product is wrapped with such impregnated wrapping-material, no mold-spores or any germs of decomposition can develop on either the outside or the inside of the wrapper, and no insects will attack the wrapper or remain upon such wrapper long enough to puncture it with their ovipositors, so that such wrapping not only prevents the superficial development of mold or decay, but also prevents the introduction of insect larvæ into the wrapped product. Further, there is a very slight suffusion of the antiseptic and the insectifuge from the wrapping-material to the surface of the wrapped product, especially in the case of a somewhat moist product such as meat, and this slight suffusion produces a surface condition, on the wrapped meat or food-product, hostile to the development of any mold-spores or germs of decomposition or insect eggs that may have been deposited on the surface of the prepared meat or food-product before its close or hermetic packing or wrapping is completed; but this slight suffusion of the antiseptic or the insectifuge, or both, to the surface of the wrapped product is so extremely superficial as to make no impairment whatever of the food qualities of the food-product and to be in fact practically imperceptible when the product is unwrapped for use. The protective qualities of the impregnated wrapping-material are permanent, because both the precipitated boron compound and the oleoresin of capsicum in the body of such wrapping-material, are non-volatile.

The protective preservative process of my invention may be embodied in various modifications within the scope of the claims hereinafter made; and the antiseptic may be omitted where the protection afforded by it is not required, as indicated by its omission from the terms of some of the said claims.

I claim:—

1. A process of protectively preserving perishable food-products, consisting in first permeating wrapping-material with an antiseptic and an insectifuge, said insectifuge being the active principle of a spice, and then closely enveloping the food-product with such wrapping-material, substantially as specified.

2. A process of protectively preserving perishable food-products, consisting in first permeating wrapping-material with an antiseptic solution and an emulsion of oleoresin of capsicum and then closely enveloping the food-product with such wrapping-material, substantially as specified.

3. A process of protectively preserving perishable food-products, consisting in first permeating wrapping-material with a solution of a boron compound and an emulsion of oleoresin of capsicum and then closely enveloping the food-product with such wrapping-material, substantially as specified.

4. A process of protectively preserving perishable food-products, consisting in first permeating wrapping-material with a solution of borax and an emulsion of oleoresin of capsicum, the impregnated material containing about two and one-half per centum of the borax and about five-hundredths of one per centum of the oleoresin of capsicum, and then closely enveloping the food-product with such wrapping-material, substantially as specified.

5. A process of protectively preserving perishable food-products, consisting in first permeating wrapping-material with an antiseptic solution and an emulsion of the oleoresin of a spice and then closely enveloping the food-product with such wrapping-material, substantially as specified.

6. In a process of protectively preserving perishable food-products, consisting in first permeating wrapping-material with an insectifuge, said insectifuge being the active principle of a spice, and then closely enveloping the food-product with such wrapping-material, substantially as specified.

7. In a process of protectively preserving perishable food-products, consisting in first permeating wrapping-material with an emulsion of oleoresin of capsicum and then closely enveloping the food-product with such wrapping-material, substantially as specified.

8. In a process of protectively preserving perishable food-products, consisting in first permeating wrapping-material with an emulsion of oleoresin of capsicum, the permeated impregnated material containing about five-hundredths of one per centum of the oleoresin of capsicum, and then closely enveloping the food-product with such wrapping-material, substantially as specified.

9. In a process of protectively preserving perishable food-products, consisting in first permeating wrapping-material with an emulsion of the oleoresin of a spice and then closely enveloping the food-product with such wrapping-material, substantially as specified.

In testimony whereof I hereunto set my hand in the presence of two subscribing witnesses.

JOHN J. FITZGERALD.

Witnesses:
HENRY LOVE CLARKE,
H. M. MUNDAY.